Aug. 18, 1925.  
H. N. OTT ET AL  
1,549,793  
CONVERTIBLE MICROSCOPE  
Filed Dec. 15, 1923
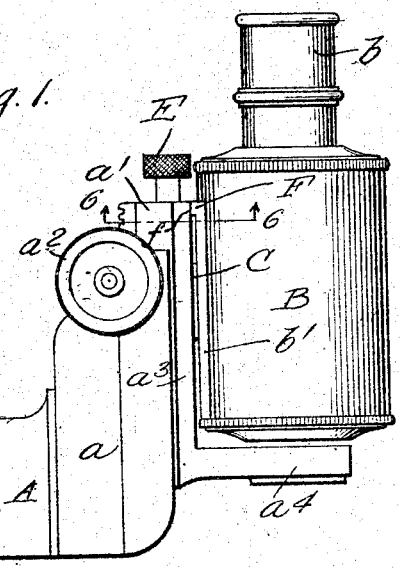
Fig. 1.
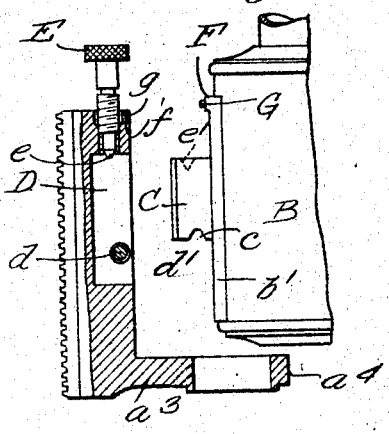
Fig. 2.
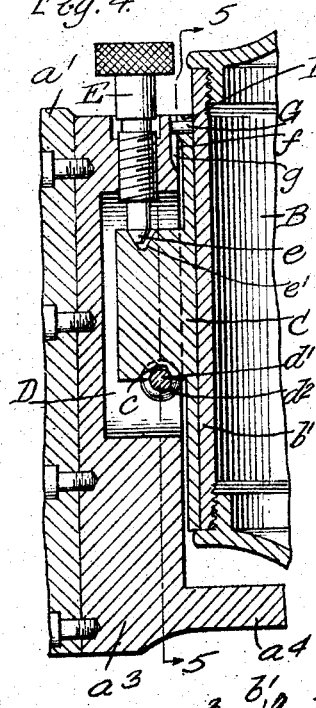
Fig. 4.
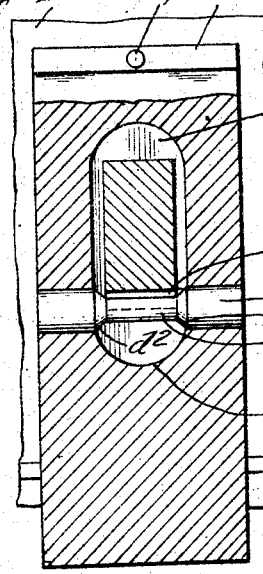
Fig. 5.
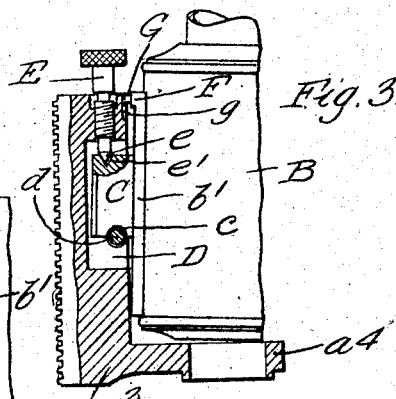
Fig. 3.
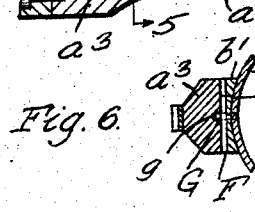
Fig. 6.
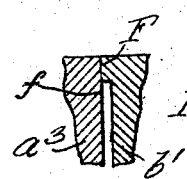
Fig. 7.
Fig. 8.
INVENTORS.  
Harvey N. Ott  
and George J. Hackford.  
by Parker & Mochwow  
ATTORNEYS.

Patented Aug. 18, 1925.

1,549,793

UNITED STATES PATENT OFFICE.

HARVEY N. OTT AND GEORGE J. HACKFORD, OF BUFFALO, NEW YORK, ASSIGNORS TO SPENCER LENS CO., OF BUFFALO, NEW YORK.

CONVERTIBLE MICROSCOPE.

Application filed December 15, 1923. Serial No. 680,945.

*To all whom it may concern:*

Be it known that we, HARVEY N. OTT and GEORGE J. HACKFORD, citizens of the United States, residing at Buffalo, in the county of Erie and State of New York, have invented a new and useful Improvement in Convertible Microscopes, of which the following is a specification.

This invention relates to microscopes of the kind having interchangeable tubes so that the microscope can be used either for monocular or binocular observation or in connection with body tubes of different kinds, without interfering with or changing the focus of the objective.

The objects of this invention are to provide convertible microscopes with means for facilitating the removal of the body tubes therefrom and the positioning of tubes thereon without affecting the objective in any way or changing the adjustment thereof; also to provide means of improved construction for ensuring the proper alinement and positioning of the body tube on the instrument; also to improve the construction of convertible microscopes of this kind in other respects hereinafter specified.

In the accompanying drawings:

Fig. 1 is a side elevation of the upper part of a microscope embodying my invention.

Fig. 2 is a fragmentary side elevation thereof, partly in section, showing the body tube removed from the instrument.

Fig. 3 is a similar view showing the body tube partly positioned on the instrument.

Fig. 4 is a similar view on an enlarged scale showing the body tube in correct relation to the adjacent parts of the instrument.

Fig. 5 is a transverse sectional elevation thereof on line 5—5, Fig. 4.

Fig. 6 is a fragmentary sectional plan view thereof on line 6—6, Fig. 1.

Fig. 7 is a fragmentary sectional elevation showing the cooperating bearing faces of the upper part of the body tube and the adjacent part of the microscope.

Fig. 8 is a fragmentary transverse sectional elevation showing a slightly modified construction.

The drawings show only the upper portion of a microscope, and A, Fig. 1, represents the upper portion of the usual arm rising from the base of the microscope. On this arm is mounted the usual intermediate slide $a$ which is provided with a vertical bearing adapted to cooperate with a corresponding bearing $a'$, to provide for the coarse adjustment of the microscope which is effected by the usual means, including a knurled wheel or knob $a^2$. The bearing $a'$ is formed on a vertically adjustable bracket or support $a^3$ having an outwardly extending arm or nose piece bracket $a^4$ at the lower portion thereof, which is adapted to receive the nose piece carrying the usual objective or objectives (not shown) of the microscope. B represents the body tube of the microscope which contains the usual eye piece or eye pieces in the upper portion $b$ thereof. The body tube terminates slightly above the nose piece bracket or arm $a^4$ and may be of any suitable or desired kind, for example, of monocular or binocular type, and is detachably mounted on the adjustable support $a^3$ in such a manner that it can be readily removed therefrom and replaced by another body tube, either for changing the microscope from a monocular to a binocular instrument, or vice versa or for using some other type of body tube in connection with the objective, the change from one form of body tube to another being made without in any way affecting the objective or its adjustment.

It has been found by experience that detachable body tubes for convertible microscopes provided with long bearing surfaces have the disadvantage that considerable skill and accuracy must be used for bringing the bearings into alinement in positioning a tube on the microscope and also since these bearings must be made with very small clearances between adjacent bearing surfaces, foreign matter sometimes enters between these bearing surfaces and causes binding, which in turn necessitates the use of considerable force to place the tube into its correct position, which may affect the adjustment of the objectives. For this reason it is desirable to provide a connection between the body tube and the instrument, which eliminates as much as possible the sliding movement of the body tube relatively to the instrument in positioning the tube on the instrument or removing the same therefrom. For this purpose, in the construction illustrated, the observation tube is provided with a part forming a saddle or bearing part $c'$ which is adapted to seat upon a suitable bearing on the adjustable support $a^3$ and which is held on its seat by some positive clamping device, such, for example, as a screw, and suitable stops are provided for holding the body tube in correct alinement when the clamping means are applied. The saddle and its bearing and the stops form contact surfaces on the body tube and the adjustable supports, which the clamping device is adapted to move into and hold in engagement.

In the particular construction illustrated, an arm or extension C is provided on the observation tube, this extension projecting outwardly from a plate $b'$ secured to or formed on the side of the tube B. The arm or extension C is adapted to enter into a slot D in the adjustable support $a^3$ and the arm or extension is provided, preferably in its lower face, with a seat or recess $c$ forming a saddle or bearing part $c^1$ adapted to cooperate with a transverse bearing, which may be in the form of a pin $d$ secured rigidly in the adjustable support $a^3$ and extending through the slot D. The arm or extension C and the saddle portion thereof are so proportioned that the sides of the arm do not engage the sides of the slot and in order to insure the correct positioning of the body tube with reference to the optical axis of the instrument, the support or pin $d$, in the construction shown, is provided with a portion $d'$ of reduced diameter, and tapering or frusto conical faces $d^2$ are provided at opposite sides of the reduced portion $d'$. The reduced portion $d'$ is of the same length as the width of the arm or extension C and consequently when the arm is pressed downwardly against its seat, the inclined portions $d^2$ guide the saddle portion of the arm or extension into its correct seating position on the bearing pin $d$. The bearing pin is preferably used to cooperate with the seat portion of the arm or extension C since a pin of this kind can be inexpensively manufactured, but it is not intended to limit the invention to a pin of this kind since obviously other seating means may be provided to cooperate with the arm or extension C for correctly positioning the body tube.

In order to insure the correct seating of the saddle on its bearing and to hold the saddle on its seat, a clamping device is provided which engages with a part of the body tube. In the construction shown for this purpose, a clamping screw E is used, which engages in a threaded hole in the upper part of the adjustable support $a^3$ and the lower end of which is tapered as shown at $e$ and extends into the slot D. The upper face of the arm or extension C is provided with a hole or recess with which the lower end of the clamping screw is adapted to cooperate, a conical hole $e'$ being shown in the construction illustrated. Consequently in positioning the body tube on the microscope, the arm or extension C is first inserted into the slot D so that the seating part or recess $c$ thereof seats on the pin $d$ and upon turning the clamping screw, the lower end of the screw will enter the conical hole $e'$ and engage one side thereof, as shown in Fig. 3. Upon further turning of the clamping screw, the engagement between the screw and the arm or extension C will move the body tube into the correct vertical position, as shown in Fig. 4, and at the same time exert a downwardly directed force upon the arm or extension C to insure a proper seating of the saddle portion thereof on the reduced portion of the bearing pin $d$.

Suitable stop means are provided to limit the movement of the body tube from its inclined position, shown in Fig. 3, so that the further movement of the body tube is stopped when the body tube reaches the vertical position, or the position in which the axis of the body tube is in correct relation to the optical axis of the instrument. In the construction shown for this purpose, a stop projection or shoulder F is provided, preferably on the upper part of the plate $b'$ of the body tube, which shoulder extends transversely thereof and is adapted to engage the upper part of the outer face $f$ of the adjustable support $a^3$. These two faces are so formed that when the two faces are brought into engagement by the turning of the clamping screw E, the body tube will be correctly positioned with reference to the optical axis of the instrument.

If desired, means may be provided for further insuring the correct positioning of the body tube. In the construction shown for this purpose, a centering pin or projection G is provided on the body tube, which preferably extends outwardly from the shoulder F thereof and which is adapted to enter into a vertical guide slot $g$ arranged on the upper part of the outer flat face $f$ of the adjustable support. This centering pin G is adapted to enter into the vertical slot $g$ for properly centering the shoulder F relatively to the adjustable support and thus ensuring the proper positioning of the body tube laterally relatively to the adjustable support $a^3$.

In the modified construction shown in Fig. 8, a substantially cylindrical bearing pin H is provided which extends through the recess D in the adjustable support $a^3$. If a pin of this kind is used, which has no reduced bearing portion corresponding to the part $d'$ of the pin $d$, other means for centering the arm or extension C must be provided, and for this purpose, in the construction shown, a pin I extends through the arm or projection C and the ends of the pin extend beyond the sides of the arm or extension C and are adapted to engage the inner upright side walls of the slot D.

In the use of the interchangeable microscope, the tube B may be mounted upon the adjustable support $a^3$ of the microscope by moving the arm or extension C into the slot D and passing the pin G into the vertical guide slot $g$. Then, upon tightening the clamping screw E, the saddle of the extension or arm C will be pressed against its seat on the bearing pin $d$ and the inclined portions of the pin will correctly position the extension or arm laterally within the slot. If the construction shown in Fig. 8 is used, the ends of the pin I, engaging the side walls of the slot, will serve to correctly position the extension C on the adjustable support $a^3$. The clamping screw also exerts a rearward pull upon the extension or arm C so as to swing this arm and the body tube from the position shown in Fig. 3 to that shown in Fig. 4, in which latter position the stop shoulder F engages the outer wall $f$ of the adjustable support $a^3$. The body tube is then positively held in correct relation to the instrument and it will be noted that no extensive sliding bearing surfaces are employed. The body tube is, therefore, easily installed on an instrument and can be removed with equal ease by simply releasing the clamping screw E and withdrawing the body tube laterally from the instrument.

We claim as our invention:

1. In a convertible microscope, the combination of an adjustable support, a body tube removably secured on said support and having a bearing part, a bearing part on said adjustable support which is adapted to cooperate with said bearing part on said body tube, and a clamping device arranged above said bearing parts and adapted to cause said body tube to swing about said bearing on said adjustable support into a correct position with reference to the optical axis of the microscope and to press said bearing parts into engagement.

2. In a convertible miscroscope, the combination of an adjustable support, a body tube removably secured on said support and having a bearing part, a bearing part on said adjustable support which is adapted to cooperate with said bearing part on said body tube, a clamping device adapted to cause said body tube to swing about said bearing on said adjustable support, and cooperating stop parts on said tube and said adjustable support to stop the swinging movement of said tube when said tube reaches the correct position with reference to the optical axis of the microscope.

3. In a convertible microscope, the combination of an adjustable support, a body tube removably secured on said support and having a bearing part, a bearing part on said adjustable support which is adapted to cooperate with said bearing part on said body tube, stop faces on said tube and said support, and a single clamping device which presses said bearing parts and said stop faces into engagement to hold said body part in correct relation to said nose piece bracket.

4. In a convertible microscope, the combination of an adjustable support, a body tube removably secured on said support and having a pair of bearing surfaces spaced apart, corresponding bearing surfaces on said adjustable support with which said bearing surfaces of said body tube are adapted to engage, and a clamping device arranged intermediate of said surfaces and serving to press said surfaces into engagement and adapted to be released to enable said body tube to be removed from said support.

5. In a convertible microscope, the combination of an adjustable support having a nose piece bracket, a body tube removably secured on said support out of contact with said nose piece bracket and having an extension projecting laterally from said body tube and having a bearing surface on the lower part thereof, a corresponding bearing surface on said adjustable support with which the bearing surface of said body tube is adapted to engage, and a clamping device adapted to act on the upper face of said extension to hold said bearing surfaces in engagement.

6. In a convertible microscope, the combination of an adjustable support having a nose piece bracket, a body tube removably secured on said support and having an extension projecting laterally from said body tube and having a bearing surface on the lower part thereof, a corresponding bearing surface on said adjustable support with which the bearing surface of said body tube is adapted to engage, a clamping device adapted to act on the upper face of said extension to hold said bearing surfaces in engagement, and stop surfaces on said body tube and said adjustable support spaced at a distance from said bearing surfaces and adapted to be held in engagement by said clamping devices, whereby said body tube is positioned in correct relation to the optical axis of the microscope.

7. In a convertible microscope, the combination of an adjustable support having a nose piece bracket, a body tube removably secured on said support out of engagement with said nose piece bracket and having an extension projecting laterally from said body tube and having a bearing surface on the lower part thereof, a corresponding bearing surface on said adjustable support with which the bearing surface of said body tube is adapted to engage, a clamping device adapted to act on the upper face of said extension at a distance from said bearing surfaces to hold said bearing surfaces in engagement, transversely extending stop surfaces on said body tube and said adjustable support which are spaced at a distance from said bearing surfaces and are held in engagement by said clamping device, and cooperating parts on said body tube and said adjustable support for holding said stop surfaces against lateral displacement relatively to each other.

8. In a convertible microscope the combination of an adjustable support having a nose piece bracket at the lower portion thereof and having a recess spaced above said nose piece bracket, a body tube removably secured on said support and having an extension projecting laterally therefrom and adapted to enter into said recess, said extension having a bearing surface on the lower part thereof, a corresponding bearing surface within said recess with which the bearing surface of said body tube is adapted to engage, and a clamping device extending into said recess and adapted to act on said extension to hold said bearing surfaces in engagement and which is releasable to permit said body tube to be removed from the microscope independently of said nose piece bracket.

9. In a convertible microscope, the combination of an adjustable support having a nose piece bracket at the lower portion thereof and having a recess spaced above said nose piece bracket, a body tube removably secured on said support and having an extension projecting laterally therefrom and adapted to enter into said recess, said extension having a bearing surface on the lower part thereof, a corresponding bearing surface within said recess with which the bearing surface of said body tube is adapted to engage, a clamping device extending into said recess and adapted to act on said extension to hold said bearing surfaces in engagement and which is releasable to permit said body tube to be removed from the microscope independently of said nose piece bracket, and contacting parts on said body tube and said adjustable support which are adapted to be held in engagement by said clamping device and which serve to position said body tube in correct relation to the optical axis of the microscope.

10. In a convertible microscope, the combination of an adjustable support having a nose piece bracket at the lower portion thereof and having a recess spaced above said nose piece bracket, a body tube removably secured on said support and having an extension projecting laterally therefrom and adapted to enter into said recess, said extension having a bearing surface on the lower part thereof, a corresponding bearing surface within said recess with which the bearing surface of said body tube is adapted to engage, said recess being of greater dimensions than said extension so that the sides of said extension are normally out of contact with the walls of said recess, and means for correctly positioning said extension in said recess.

11. In a convertible microscope, the combination of an adjustable support having a nose piece bracket, a body tube removably secured on said support out of engagement with said nose piece bracket, an extension projecting laterally from said body tube and having a bearing surface on the lower portion thereof, a bearing on said adjustable support and with which said bearing surface is adapted to engage, cooperating parts on said extension and said bearing for correctly positioning said extension on said bearing, and a clamping device adapted to act on said extension to press said bearing surfaces into engagement and to move said cooperative parts into engagement.

12. In a convertible microscope, the combination of an adjustable support having a nose piece bracket, a body tube removably secured on said support, an extension projecting laterally from said body tube and having a bearing surface on the lower portion thereof, a bearing on said adjustable support and with which said bearing surface is adapted to engage, said bearing having an intermediate depressed portion and downwardly inclined parts terminating in said depressed portion, said inclined parts serving to correctly position said bearing surface of said extension on said bearing, and clamping means for holding said bearing surface in engagement with said bearing.

13. A convertible microscope having an adjustable support provided with a recess, a body tube having an extension adapted to enter into said recess and having a bearing surface on the lower part of said extension, a bearing pin extending across said recess and with which said bearing surface is adapted to engage, a clamping screw extending downwardly into said recess and adapted to engage the upper part of said extension and to press said bearing surface into engagement with said bearing pin, and cooperating parts on said body tube and on the upper part of said adjustable support which are adapted to be held in engagement by said clamping screw for correctly positioning said body tube with reference to the microscope.

14. In a convertible microscope, the combination of an adjustable support having a nose piece bracket at the lower portion thereof and having a recess spaced above said nose piece bracket, a body tube removably secured on said support and having an extension projecting laterally therefrom and adapted to enter into said recess, said extension having a bearing surface on the lower part thereof, a bearing pin extending through said recess and having an intermediate portion of reduced cross section and tapering parts connecting said reduced portion of said pin with the portions thereof of larger diameter, said tapering parts serving to correctly position said bearing surface of said extension on the reduced portion of said bearing pin, and a clamping screw extending into said recess and adapted to press said bearing surface into engagement with said bearing pin and adapted to be released to permit said body tube to be removed from said miscroscope.

HARVEY N. OTT.
GEORGE J. HACKFORD.